United States Patent
Horn

(10) Patent No.: US 9,025,563 B2
(45) Date of Patent: May 5, 2015

(54) SUPPORTING COMMUNICATIONS IN A WIRELESS NETWORK USING AN IP ADDRESS

(75) Inventor: Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1174 days.

(21) Appl. No.: 12/056,129

(22) Filed: Mar. 26, 2008

(65) Prior Publication Data

US 2009/0232115 A1    Sep. 17, 2009

Related U.S. Application Data

(60) Provisional application No. 61/036,236, filed on Mar. 13, 2008.

(51) Int. Cl.
| | |
|---|---|
| *H04W 4/00* | (2009.01) |
| *H04W 8/26* | (2009.01) |
| *H04L 29/12* | (2006.01) |
| *H04W 28/04* | (2009.01) |
| *H04W 80/04* | (2009.01) |
| *H04W 84/12* | (2009.01) |

(52) U.S. Cl.
CPC ........... *H04W 8/26* (2013.01); *H04L 29/12311* (2013.01); *H04L 61/2084* (2013.01); *H04W 28/04* (2013.01); *H04W 80/04* (2013.01); *H04W 84/12* (2013.01)

(58) Field of Classification Search
USPC .......................... 370/331, 338, 431; 455/429.1
See application file for complete search history.

(56) References Cited

U.S. PATENT DOCUMENTS

| | | | | |
|---|---|---|---|---|
| 5,794,129 | A * | 8/1998 | Komatsu | 455/69 |
| 7,161,933 | B2 * | 1/2007 | Stanford | 370/352 |
| 7,877,094 | B2 * | 1/2011 | Fox et al. | 455/438 |
| 2003/0216140 | A1 * | 11/2003 | Chambert | 455/426.1 |
| 2004/0264476 | A1 | 12/2004 | Alarcon et al. | |
| 2006/0092879 | A1 | 5/2006 | Jeong et al. | |
| 2007/0014262 | A1 * | 1/2007 | Gras et al. | 370/331 |
| 2007/0060057 | A1 | 3/2007 | Matsuo et al. | |
| 2007/0147377 | A1 | 6/2007 | Laroia et al. | |
| 2007/0280170 | A1 * | 12/2007 | Kawasaki | 370/331 |
| 2007/0291770 | A1 | 12/2007 | Kitazoe | |

(Continued)

FOREIGN PATENT DOCUMENTS

| | | |
|---|---|---|
| CN | 1823545 A | 8/2006 |
| CN | 1902978 A | 1/2007 |

(Continued)

OTHER PUBLICATIONS

Eurescom Participants in Project P113: Fast Handovers for Mobile IPve'Turescom Technical Information Specification, XX, XX, Jan. 1, 2002, pp. 1-14, XP002297367.

(Continued)

*Primary Examiner* — Phuc Tran
(74) *Attorney, Agent, or Firm* — Eric Ho

(57) ABSTRACT

An apparatus for wireless communications and method for the same are provided. The apparatus is configured receive an identifier associated with a first node, determine an IP address of the first node from the identifier, and use the IP address to communicate data with the first node through a second node, wherein the data relates to managing air link resources of the first node.

37 Claims, 6 Drawing Sheets

(56) References Cited

U.S. PATENT DOCUMENTS

| | | | |
|---|---|---|---|
| 2008/0014934 A1 | 1/2008 | Balasubramanian et al. | |
| 2008/0037450 A1* | 2/2008 | Itoh et al. | 370/278 |
| 2008/0112362 A1* | 5/2008 | Korus | 370/331 |
| 2008/0144976 A1 | 6/2008 | Chosa et al. | |
| 2009/0257407 A1* | 10/2009 | Park et al. | 370/336 |

FOREIGN PATENT DOCUMENTS

| | | |
|---|---|---|
| JP | 2003188894 A | 7/2003 |
| JP | 2005354423 A | 12/2005 |
| JP | 2006135994 A | 5/2006 |
| JP | 2007511147 A | 4/2007 |
| JP | 2007522725 A | 8/2007 |
| JP | 2009506652 A | 2/2009 |
| JP | 2009512267 A | 3/2009 |
| KR | 20050002338 A | 1/2005 |
| TW | I272809 B | 2/2007 |
| WO | WO03079700 | 9/2003 |
| WO | WO2005051026 A1 | 6/2005 |
| WO | WO-2005072183 A2 | 8/2005 |
| WO | 2007024895 A2 | 3/2007 |
| WO | 2007040331 A1 | 4/2007 |
| WO | 2007149767 A2 | 12/2007 |
| WO | WO2008012223 | 1/2008 |
| WO | WO2008012223 A1 | 1/2008 |

OTHER PUBLICATIONS

International Search Report and Written Opinion—PCT/US08/058511, International Searching Authority—European Patent Office, Dec. 18, 2008.

Taiwan Search Report—TW097122901—TIPO—Apr. 6, 2012.

* cited by examiner

SUPPORTING COMMUNICATIONS IN A WIRELESS NETWORK USING AN IP ADDRESS

CLAIM OF PRIORITY UNDER 35 U.S.C. §119

The present Application for Patent claims priority to Provisional Application No. 61/036,236, entitled "SUPPORTING COMMUNICATIONS IN A WIRELESS NETWORK USING AN IP ADDRESS" filed on Mar. 13, 2008, and assigned to the assignee hereof and hereby expressly incorporated by reference herein.

BACKGROUND

1. Field

The present disclosure relates generally to telecommunications, and more particularly, to systems and methods for supporting communications in a wireless network using an Internet protocol (IP) address.

2. Background

Wireless networks are often used to provide wireless coverage over a large geographic area—for example, a city, metropolitan area, a state, county or sometimes an entire country. Such networks are sometimes referred to as Wireless Wide Area Networks (WWAN). Recently, smaller wireless networks known as Wireless Local Area Networks (WLAN) have been deployed to cover smaller areas with a geographic coverage ranging from a few tens of meters to a few hundred meters. These wide area and local area networks are generally made up of a collection of wireless nodes that work together to provide users with access to large network infrastructures, such as the Internet. To achieve seamless mobility as a user roams through the wireless network, efficient methods should be employed to handoff the wireless device from one wireless node to another. These methods should be implemented to minimize the delay between handoffs, as well as reduce the failure rate of such handoffs.

Additionally, a user in communication with one wireless node may need to signal another wireless node to reduce interference. These methods should be implemented in an efficient manner to optimize performance.

SUMMARY

In one aspect of the disclosure, an apparatus for wireless communication includes a processing system configured to receive an identifier associated with a first node, determine an IP address of the first node from the identifier, and use the IP address to communicate data with the first node through a second node, wherein the data relates to managing air link resources of the first node.

In another aspect of the disclosure, a method of wireless communications includes receiving an identifier associated with a first node, determining an IP address of the first node from the identifier, and using the IP address to communicate data with the first node through a second node, wherein the data relates to managing air link resources of the first node.

In yet another aspect of the disclosure, an apparatus for wireless communications includes means for receiving an identifier associated with a first node, means for determining an IP address of the first node from the identifier, and means for using the IP address to communicate data with the first node through a second node, wherein the data relates to managing air link resources of the first node.

In a further aspect of the disclosure, a computer-program product for communications includes a machine-readable medium comprising instructions executable by a processing system to receive an identifier associated with a first node, determine an IP address of the first node from the identifier, and use the IP address to communicate data with the first node through a second node, wherein the data relates to managing air link resources of the first node.

In yet a further aspect of the disclosure, an access terminal for wireless communications includes a processing system configured to receive an identifier associated with a first node, determine an IP address of the first node from the identifier, and use the IP address to communicate data with the first node through a second node, wherein the data relates to managing air link resources of the first node, and a user interface supported by the processing system.

It is understood that other aspects of the invention will become readily apparent to those skilled in the art from the following detailed description, wherein various aspects of the invention are shown and described by way of illustration. As will be realized, the invention is capable of modification in various other respects, all without departing from the scope of the invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawings, wherein.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects an apparatus includes a processing system configured to receive an identifier associated with a first node, determine an IP address of the first node from the identifier, and use the IP address to communicate data with the first node through a second node, wherein the data relates to managing air link resources for the first node.

Figure 1:
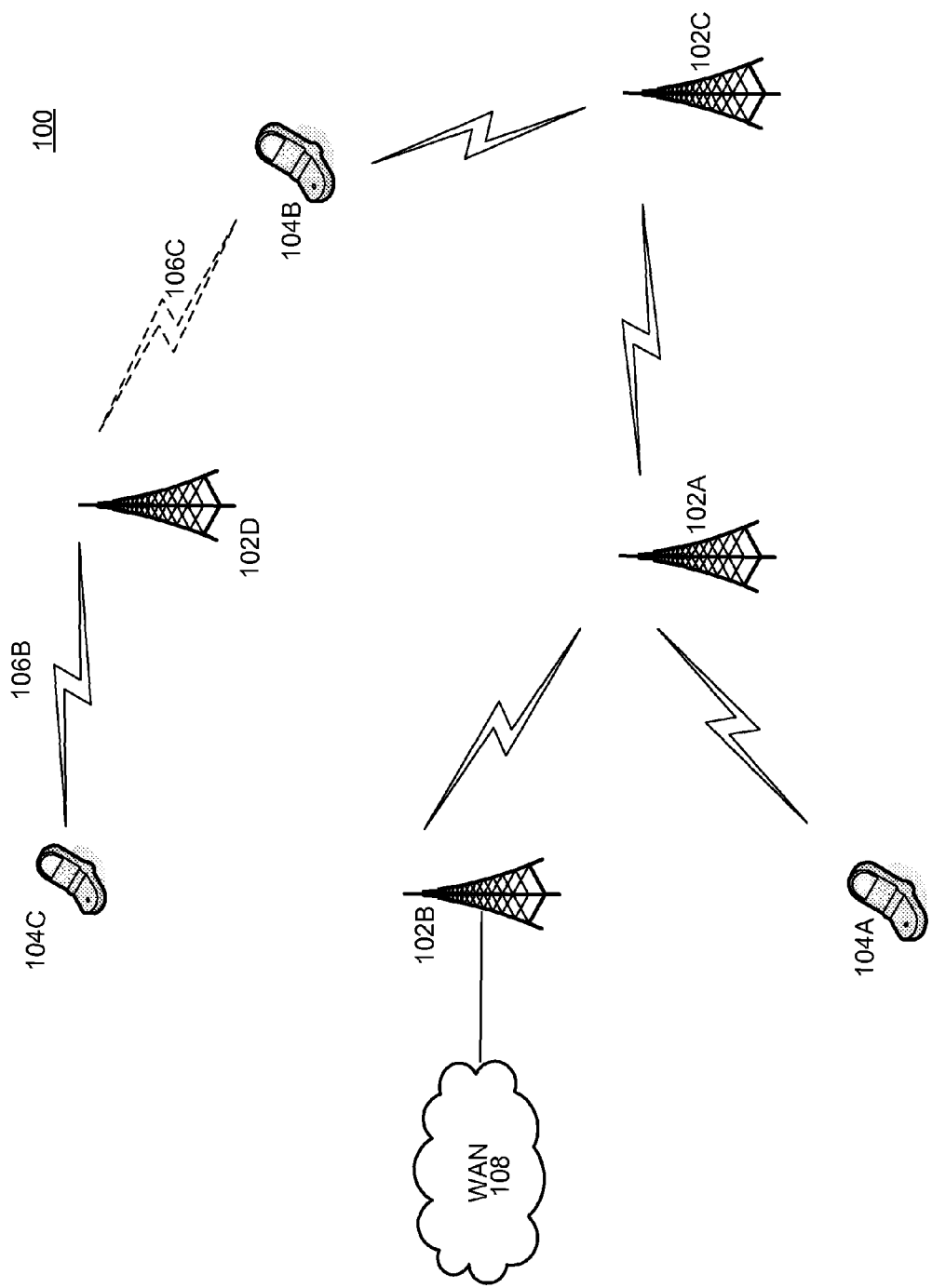
FIG. 1 is a conceptual diagram of an example of a communications system.

FIG. 1 illustrates several sample aspects of a wireless communication system 100. The system 100 includes several wireless nodes, generally designated as nodes 102 and 104. A given node may receive and/or transmit one or more traffic flows (e.g., data flows) via one or more communication channels (e.g., where a given channel may be associated with a given carrier). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, an access point, a relay point, or some other network-related component. Referring to FIG. 1, the nodes 102 may comprise access points or relay points and the nodes 104 may comprise access terminals. The nodes 102 may thus facilitate communication between other nodes of a network (e.g., a Wi-Fi network, a cellular network, or a WiMax network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the nodes (e.g., node 102B) may comprise a wired access point that provides connectivity to another network or networks (e.g., a wide area network 108 such as the Internet).

In some aspects two or more nodes of the system 100 (e.g., nodes of a common independent service set) associate with one another to establish traffic flows between the nodes via one or more communication links. For example, an access terminal 104B and an access point 102C may associate with one another such that one or more traffic flows are established between the two.

In operation, a node (e.g., access terminal 104A) may be configured to periodically search for beacons from the system 100. A beacon is a reference signal that is transmitted by each node 102 and is used for acquisition by another node. In this example, when the access terminal 104A first moves into the vicinity of the system 100, it will begin to detect a beacon from one or more nodes 102. Based on various parameters, such as the signal strength of the beacons, the access terminal 104A may select a node 102 to establish a radio link by means well known in the art. This node becomes the access point to the system 100 for the access terminal 104A, which is shown in FIG. 1 as node 102A.

Once the access terminal 104 establishes a radio link with a node (e.g., access point 102A) it may then attempt to establish a session with either the access point 102A, or some other entity associated with the system 100. In this example, a session is established when the access terminal 104 and the access point 102A, or the other entity, are able to exchange application level communications. The session provides a mechanism to allow communications for different flows, perhaps through different nodes 102, to be properly combined and processed by the access terminal 104A and the access point 102A, or other entity. The session may be established by certain procedures that are well known in the art. By way of example, the access point 102A may provide authentication, authorization and accounting to the access terminal 104A by accessing a central database (not shown) that contains information for each access terminal that is authorized to use the system 100. If a secured session is required, encryption keys may also be exchanged between the access point 102A and the access terminal 104. In addition, various other attributes that affect the characteristics of the connection and the service received by the access terminal 104A may be negotiated, such as bandwidth and quality of service (QoS).

Once the access terminal 104 has gained access to the system 100, it may continue to listen for beacons from other nodes 102 and measure the signal strength of the beacons it detects. The access terminal 104 may use these measurements to create and maintain an active list. The active list may include, by way of example, nodes 102 that can provide service to the access terminal 104. In addition, or alternatively, the active list may include nodes 102 that do not provide service, but interfere with the access terminal (e.g., a node that is restricted for association and handoff to the terminal). As the access terminal 104 continues to listen and measure the signal strength of the beacons from the other nodes 102, it may add or remove nodes 102 from the active list as it roams through the system 100.

The process of adding a node 102 to the active list involves communications or signaling between the node 102 and the access terminal 104. The communications may involve an exchange of data for negotiating and reserving radio resources for the access terminal 104 should a handoff be required. By reserving radio resources from each node 102 in the active list before a handoff is required, the access terminal 104 is able to quickly switch between nodes 102 while maintaining the session with the access point 102A, or other entity.

A handoff from one node 102 to another node 102 generally occurs in response to the access terminal 104A moving through the system 100, although other conditions may trigger a handoff such as the inability of the access point 102 currently serving the access terminal 104A to provide the required bandwidth or QoS. In any event, once the access terminal 104A determines that a handoff is required, its selects a node 102 from the active list to receive the handoff.

Figure 2:
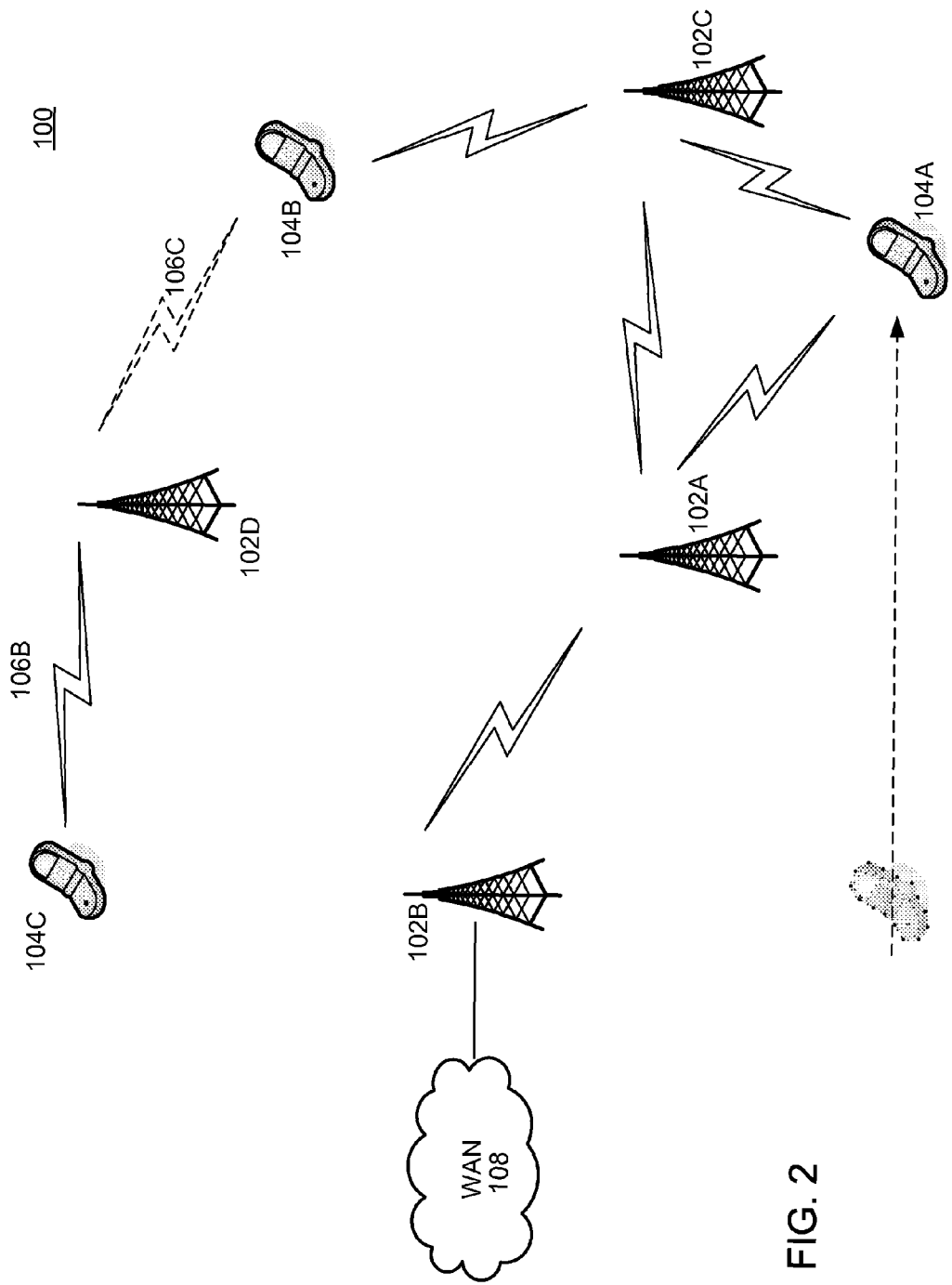
FIG. 2 is a conceptual diagram of an example of a communications system showing an access terminal initiating a handoff in a wireless network.

FIG. 2 is a conceptual diagram of an example of an access terminal initiating a handoff. The access point 102A currently serving the access terminal 104A will be referred to as the "serving access point" and the node 102C that will receive the handoff of the access terminal 104A will be referred to as the "target access point." In this example, the handoff is preceded by certain communications or signaling between the access terminal 104 and the target access point 102C. The communications may include an exchange of data wherein the access terminal 104A sends a handoff request to the target access point 102C and the target access point 102C responds to the access terminal 104A by granting the request. The access terminal 104A may also send session state information to the target access point 102C, or prompt the target access point 102C to retrieve the session state information from some other entity. Security information may also be provided to the target access point 102C to enable the target access point 102C to provide authentication, authorization, and accounting with a central database (not shown).

Figure 3:
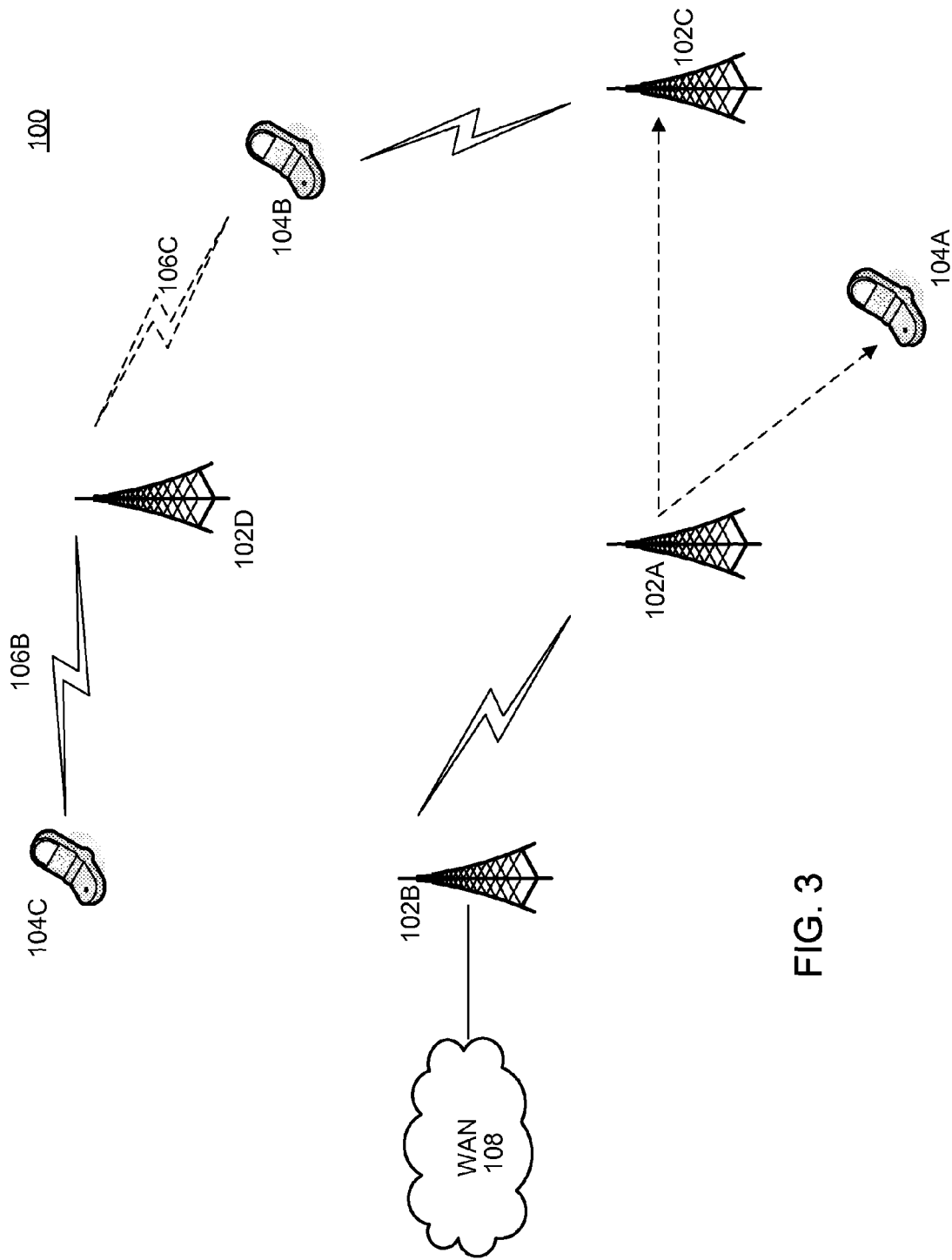
FIG. 3 is a conceptual diagram of an example of a communications system showing how data is exchanged between an access terminal and a target access point for a handoff.

FIG. 3 is a conceptual diagram of an example showing how data is exchanged between the access terminal 104A and the target access point 102C to (1) add the target access point 102C to the active list, or (2) handoff the access terminal 104A to the target access point 102C. In both cases, the data exchanged between the access terminal 104A and the target access point 102C is forwarded by the serving access point 102A using IP addresses. By using IP addresses, the serving access point 102A does not have to process the data and may function as a router for the IP packet or forward the IP packet to a first hop router for the serving access point 102A.

Referring to FIG. 3, the access terminal 104A communicates with the target access point 102C through the serving access point 102A with a series of data packets. Each data packet includes the destination IP address and payload. The payload may include data related to managing air link resources for the target access point 102C including, by way of example, signaling to reserve air link resources, a handoff request, a grant to a handoff request, session information, security information, or any other signaling. The IP address in each data packet provides the routing information required by the serving access point 102A to forward the payloads between the access terminal 104A and the target access point 102C.

The access terminal 104A may obtain the IP address for the target access point 102C in any number of ways. By way of example, the target access point 102C, as well as all other nodes 102 in the system 100, may continuously or periodically broadcast its IP address over a control channel. In this example, the access terminal 104A merely monitors the control channel for the target access point's IP address.

Figure 4:
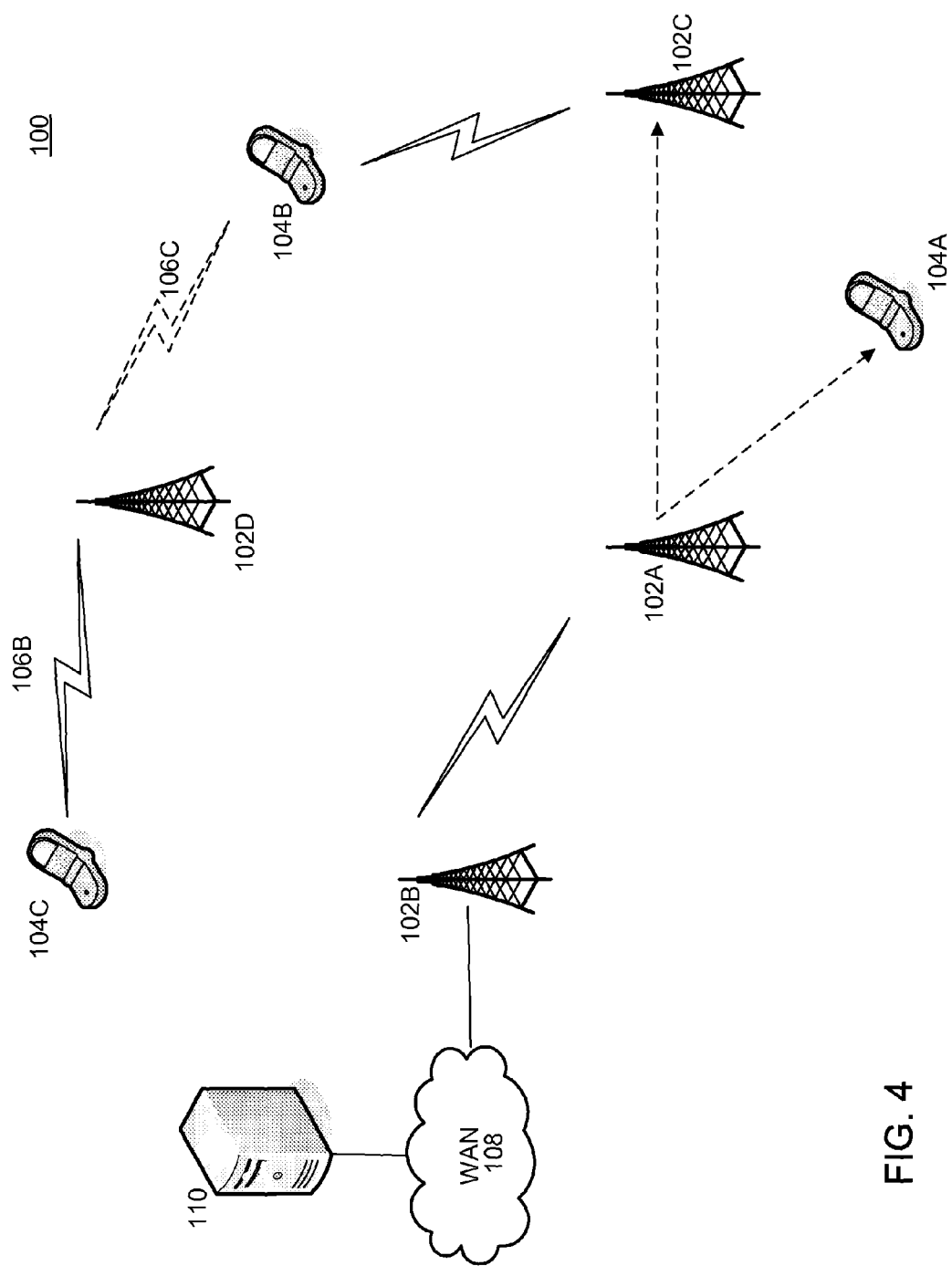
FIG. 4 is a conceptual diagram of an example of a wireless communications system with a server to support a handoff of an access terminal in a wireless network.

Alternatively, the target access point 102C, as well as the other nodes 102 in the system 100, may broadcast an identifier over a control channel. This may be an attractive alternative to broadcasting an IP address, which may require more bandwidth. In this example, the access terminal 104A monitors the control channel for the target access point's identifier. Upon receiving the identifier, the access terminal 104A resolves the identifier into the IP address for the target access point 102C. This may be achieved by querying a server with the identifier. Referring to FIG. 4, a server 110 may be used to translate the identifier to the IP address for the target access point 102C. The IP address may be delivered to the access terminal 104A through the network 108 or by some other means.

As another example, the access terminal 104A may use a look up table in memory to translate the identifier to the IP address for the target access point 102C. The look up table may be provided to the access terminal 104A from the system 100, or another entity, when it initially accesses the system 100, or the look up table could be provisioned into the access terminal 104A. The IP address may be also calculated as a combination of one or more of the above techniques. By way of example, a portion of the IP address may be broadcast and another portion of the IP address may be derived using a query, look up table, etc.

As those skilled in the art will readily appreciate, the use of IP addresses in this manner may be extended to other applications where an access terminal, in communication with a serving access point, needs to communication with one or more other nodes in the wireless network. By way of example, wireless transmissions from a node 102 in the system 100 may interfere with reception at a non-associated node in the system 100. Returning to FIG. 1, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power and timing of the node 102D, transmissions from the node 102D (as represented by a dashed symbol 106C) may interfere with reception at the node 104B. In this example, the node 104B may send a request to the node 102D to limit its interfering transmission to the node 104C. The message may be sent by the node 104B to the node 102D through the node 102C by using the IP address of the node 102D. The node 102C forwards the packets and does not need to process the message. Upon receipt of the message, the node 102D may elect to abstain from transmitting, may reduce its transmit power, or may ignore the message.

Figure 5:
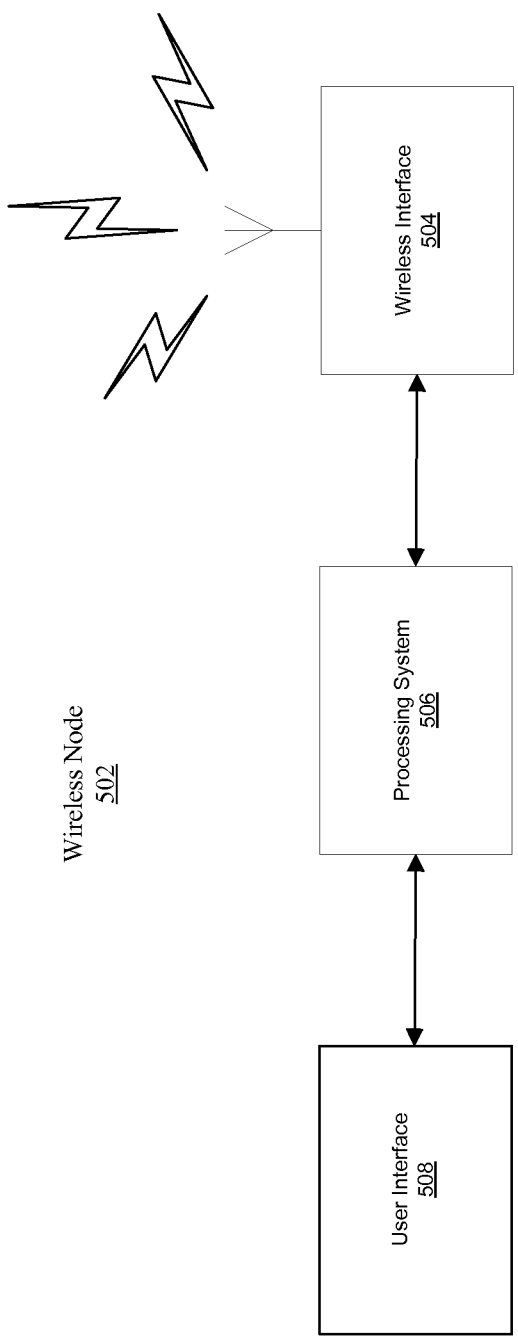
FIG. 5 is a conceptual block diagram of a wireless node for use in the communications system of FIG. 1.

FIG. 5 is a block diagram illustrating an example of the functionality of a node. The node 502 may function as an access terminal, an access point, a relay point, or some other network-related component.

The following description of the node 502 is informative in nature and broadly defines the functionality of each block. Only the functionality pertinent to various concepts disclosed herein will be described. Those skilled in the art will recognize that these functional blocks can provide other functionality that is not described herein. In this example, the node 502 includes three functional blocks: a wireless interface 504, a processing system 506, and a user interface 508.

The wireless interface 504 may be configured as a transceiver that provides both a transmitting and receiving function. The transmitting function includes modulating a carrier with data. The receiving function includes demodulating a carrier to recover data. The wireless interface 504 may also provide various other functions, such as RF front-end processing, analog/digital conversion, timing and frequency estimation, channel estimation, turbo coding etc. In summary, the wireless interface 504 may be configured to provide the complete physical layer implementation of the node 502.

The processing system 506, either alone or in combination with other entities in the node 502, may be configured to implement all functionality above the physical layer. Alternatively, the processing system 506 may also implement all or part of the physical layer. In the most general terms, the processing system 506 is configured to use the transmitting and receiving functions of the wireless interface 504 to support communications. In addition, the processing system 506 supports various handoff procedures using IP addresses to send and receive data.

The processing system 506 may include one or more processors. A processor may be a general purpose microprocessor, a microcontroller, a Digital Signal Processor (DSP), an Application Specific Integrated Circuit (ASIC), a Field Programmable Gate Array (FPGA), a Programmable Logic Device (PLD), logic circuits, discrete hardware components, or any other suitable entity that can perform calculations or other manipulations of information.

The processing system 506 may also include one or more machine-readable media to provide data storage, including look up tables for translating identifiers to IP addresses for access terminal applications, and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

The node 502, when functioning as an access terminal, may also include a user interface 508. The user interface 508 may include a display, keypad, speaker, microphone, and/or any other suitable interface that enables a user to operate the access terminal. The user interface 508 is used to control the data that is transmitted and received by the processing system 506 over a radio link by the wireless interface.

The node 502, when functioning as a node in a wireless network, may also include a wireless interface 504 that is capable of maintaining any suitable number of wireless downlink connections with access terminals and/or wireless nodes, as well as maintain one or more uplink connections to support the backhaul. The uplink connection may be wired or wireless.

Figure 6:
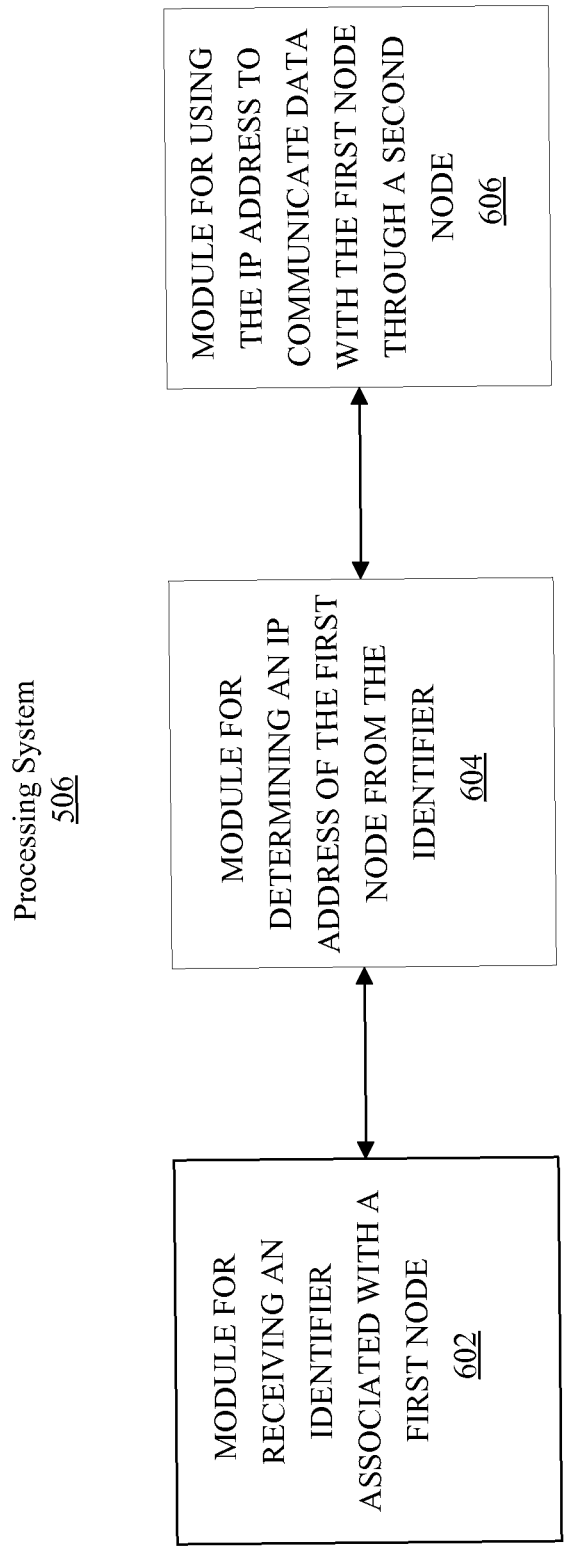
FIG. 6 is a block diagram illustrating an example of the functionality of a processing system in the wireless node of FIG. 5.

FIG. 6 is a block diagram illustrating an example of the functionality of a processing system 506. In this example, the processing system 506 includes a module 602 for receiving an identifier associated with a first node, a module 604 for determining an IP address of the first node from the identifier, and a module 606 for using the IP address to communicate data with the first node through a second node, wherein the data relates to managing air link resources for the first node.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
a processing system configured to receive an identifier associated with a first node, determine an IP address of the first node from the identifier, and use the IP address to communicate data with the first node through a second node, wherein the data relates to managing air link resources of the first node, wherein the data relating to managing air link resources comprises a request to the first node to limit transmissions that interfere with reception at the apparatus on a portion of the air link resources.

2. The apparatus of claim 1 wherein the data relating to managing air link resources comprises information identifying the apparatus.

3. The apparatus of claim 1 wherein the processing system is further configured to maintain an active list, and wherein the data relating to managing air link resources comprises data related to adding the first node to the active list.

4. The apparatus of claim 3 wherein the data related to adding the first node to the active list comprises signaling to reserve air link resources at the first node.

5. The apparatus of claim 4 wherein the data to support a handoff comprises a handoff request, session state information, or security information.

6. The apparatus of claim 1 wherein the data relating to managing air link resources comprises data to support a handoff from the second node to the first node.

7. The apparatus of claim 1 wherein the identifier comprises the IP address.

8. The apparatus of claim 1 wherein the processing system is further configured to determine the IP address by using the identifier to query a server.

9. The apparatus of claim 1 wherein the processing system further comprises memory configured to translate the identifier to the IP address.

10. The apparatus of claim 1 wherein the processing system is further configured to receive the identifier from the first node via a control channel.

11. The apparatus of claim 1 wherein the processing system is further configured to maintain an active list of available nodes including the first node.

12. The apparatus of claim 1 wherein the identifier is received directly from the first node over a wireless link.

13. The apparatus of claim 1 wherein the data is communicated via at least one packet comprising a destination address of the first node to enable the second node to forward the at least one packet to the first node.

14. A method of wireless communications, comprising:
receiving, at an apparatus, an identifier associated with a first node;
determining, at the apparatus, an IP address of the first node from the identifier; and
using, by the apparatus, the IP address to communicate data with the first node through a second node, wherein the data relates to managing air link resources of the first node, wherein the data relating to managing air link resources comprises a request to the first node to limit transmissions that interfere with reception at the apparatus on a portion of the air link resources.

15. The method of claim 14 wherein the data relating to managing air link resources comprises identifying information of the apparatus.

16. The method of claim 14 further comprising maintaining an active list, and wherein the data relating to managing air link resources comprises data related to adding the first node to the active list.

17. The method of claim 16 wherein the data related to adding the first node to the active list comprises signaling to reserve air link resources at the first node.

18. The method of claim 14 wherein the data relating to managing air link resources comprises data to support a handoff from the second node to the first node.

19. The method of claim 18 wherein the data to support a handoff comprises a handoff request, session state information, or security information.

20. The method of claim 14 wherein the identifier comprises the IP address.

21. The method of claim 14 wherein the determination of the IP address comprises using the identifier to query a server.

22. The method of claim 14 further comprising translating the identifier to the IP address.

23. The method of claim 14 further comprising receiving the identifier from the first node via a control channel.

24. The method of claim 14 further comprising maintaining an active list of available nodes including the first node.

25. An apparatus for wireless communications, comprising:
means for receiving an identifier associated with a first node;
means for determining an IP address of the first node from the identifier; and means for using the IP address to communicate data with the first node through a second node, wherein the data relates to managing air link resources of the first node, wherein the data relating to managing air link resources comprises a request to the first node to limit transmissions that interfere with reception at the apparatus on a portion of the air link resources.

26. The apparatus of claim 25 wherein the data relating to managing air link resources comprises information identifying the apparatus.

27. The apparatus of claim 25 further comprising means for maintaining an active list, and wherein the data relating to managing air link resources comprises data related to adding the first node to the active list.

28. The apparatus of claim 27 wherein the data related to adding the first node to the active list comprises signaling to reserve air link resources at the first node.

29. The apparatus of claim 25 wherein the data relating to managing air link resources comprises data to support a handoff from the second node to the first node.

30. The apparatus of claim 29 wherein the data to support a handoff comprises a handoff request, session state information, or security information.

31. The apparatus of claim 25 wherein the identifier comprises the IP address.

32. The apparatus of claim 25 wherein the means for determining the IP address comprises means for using the identifier to query a server.

33. The apparatus of claim 25 further comprising means for translating the identifier to the IP address.

34. The apparatus of claim 25 further comprising means for receiving the identifier from the first node via a control channel.

35. The apparatus of claim 25 further comprising means for maintaining an active list of available nodes including the first node.

36. A computer-program product for communication, comprising:
a machine-readable storage medium comprising instructions executable by a processing system to:
receive, at an apparatus, an identifier associated with a first node;
determine, at the apparatus, an IP address of the first node from the identifier; and
use, by the apparatus, the IP address to communicate data with the first node through a second node, wherein the data relates to managing air link resources of the first node, wherein the data relating to managing air link resources comprises a request to the first node to limit transmissions that interfere with reception at the apparatus on a portion of the air link resources.

37. An access terminal for wireless communications, comprising:
a processing system configured to receive an identifier associated with a first node, determine an IP address of the first node from the identifier, and use the IP address to communicate data with the first node through a second node, wherein the data relates to managing air link resources of the first node, wherein the data relating to managing air link resources comprises a request to the first node to limit transmissions that interfere with reception at the access terminal on a portion of the air link resources; and
a user interface supported by the processing system.

* * * * *